Patented Dec. 29, 1953

2,664,437

UNITED STATES PATENT OFFICE 2,664,437

O-(2-CHLORO-4-NITROPHENYL) O,O DIMETHYL THIOPHOSPHATE

John H. Fletcher, Stamford, Conn., assignor to American Cyanamid Company, New York, N. Y., a corporation of Maine No Drawing. Application March 15, 1950, Serial No. 149,881

1 Claim. (Cl. 260—461)

The present invention relates to O-(2-chloro-4-nitrophenyl) O,O-dimethyl thiophosphate, a new compound.

This compound is an unusually effective insecticide and is outstanding among many phosphate esters in its low warm-blooded animal toxicity. O-(2-chloro-4-nitrophenyl) O,O-dimethyl thiophosphate gave 90 to 100% kills of aphids at a concentration of 1–28,000 in water. The L. D.$_{50}$ of O-(2-chloro-4-nitrophenyl) O,O-dimethyl thiophosphate (administered orally) for albino mice is 400 mg./kg. of body weight, while the L. D.$_{50}$ of the diethyl homologue is 31.5 mg./kg. of body weight.

The phosphate ester of this invention may be readily prepared by reacting O,O-dimethyl chlorothiophosphate with an alkali-forming metal phenoxide of the formula

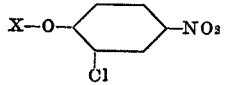

in which X represents an alkali-forming metal.

The term "alkali-forming metal" as used in this specification and in the appended claim is intended to cover the alkali metals (including ammonium) and the alkaline earth metals.

The O,O-dimethyl chlorothiophosphate employed in the present process may be prepared according to the methods described in U. S. Patent No. 2,482,063.

A typical reaction in which O,O-dimethyl chlorothiophosphate is reacted with sodium 2-chloro-4-nitrophenoxide may be illustrated as follows:

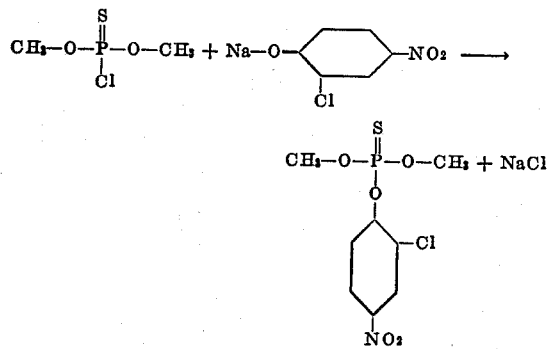

The reaction may be facilitated by conducting it in the presence of a solvent. Such solvents include the low molecular weight aliphatic monohydric alcohols such as, for example, the methyl, ethyl, isopropyl, tert.-butyl and sec.-amyl alcohols; ketones such as acetone, methyl ethyl ketone, methyl isobutyl ketone, methyl benzyl ketone, cyclohexanone, and acetophenone; alkyl esters of aliphatic monocarboxylic acids having boiling points less than 200° C. such as ethyl acetate, n-butyl acetate, isobutyl acetate, 2-ethyl hexyl acetate, ethyl propionate, methyl butyrate, and n-propyl valerate; aromatic nitriles and aliphatic saturated nitriles having boiling points not greater than 220° C. such as benzonitrile, acetonitrile, propionitrile, isobutyronitrile, and n-capronitrile; nitrobenzene and water.

A temperature within the range of from about 30° C. to 150° C. is preferred for carrying out the reaction.

An alternative method of preparing the compound of the present invention consists in employing in lieu of the alkali-forming metal 2-chloro-4-nitrophenoxide the 2-chloro-4-nitrophenol and a basic alkali-forming metal compound, the latter having sufficient alkalinity to neutralize the phenol. Obviously, this procedure avoids the initial preparation and isolation of the alkali-forming metal phenoxide. Such basic alkali-forming metal compounds include sodium carbonate, potassium carbonate, barium carbonate, magnesium carbonate, lithium carbonate, sodium hydroxide, potassium hydroxide, calcium hydroxide, strontium hydroxide, magnesium hydroxide, sodium borate, tripotassium arsenate, tripotassium arsenite, sodium pyrophosphate, magnesium pyrophosphate, potassium pyrophosphate, barium phosphate, trisodium phosphate, and the like.

The following examples will further illustrate the invention.

*Example 1*

A mixture of 10.6 g. of O,O-dimethyl chlorothiophosphate, 11.8 g. of sodium 2-chloro-4-nitrophenoxide and 120 cc. of methyl isobutyl ketone was heated to reflux for 2 hours in a vessel equipped with a thermometer, stirrer, and reflux condenser. The reaction mixture was cooled to room temperature, washed with 5% sodium carbonate solution, and then with water. After filtering and drying over anhydrous sodium sulfate, the ketone was removed by distillation at reduced pressure. The residue, O-(2-chloro-4-nitrophenyl) O,O-dimethyl thiophosphate, weighed 14.2 g. (79.5% yield). After recrystallization from methyl alcohol, the product was a white solid melting at 51–52° C.

*Example 2*

52 g. of 2-chloro-4-nitrophenol, 31.8 g. of anhydrous sodium carbonate, and 400 cc. of n-butyl acetate were mixed together at room temperature with good stirring in a vessel equipped with a reflux condenser. 53 g. of O,O-dimethyl chlorothiophosphate were added, and the mixture was stirred and heated at 85-90° C. for 3 hours. The reaction mixture was filtered to remove the by-product salts. The filtrate was washed with 5% sodium carbonate solution and then with water. The washed organic layer was filtered, dried over anhydrous sodium sulfate, and stripped of solvent, leaving 79.9 g. (89.6% yield) of O-(2-chloro-4-nitrophenyl) O,O-dimethyl thiophosphate.

*Example 3*

The procedure of Example 2 was employed using 308.7 g. of 2-chloro-4-nitrophenol, 189 g. of anhydrous sodium carbonate, 316 g. of O,O-dimethyl chlorothiophosphate and 2500 cc. of methyl isobutyl ketone. 410.4 g. (78.3% yield) of O-(2-chloro-4-nitrophenyl) O,O - dimethyl thiophosphate were obtained.

*Example 4*

52 g. of 2-chloro-4-nitrophenol, 31.8 g. of anhydrous sodium carbonate and 300 cc. of isopropyl alcohol were mixed together at a temperature of 50° C. in a vessel equipped with a reflux condenser. 59.7 g. of O,O-dimethyl chlo-rothiophosphate were added slowly and the mixture was stirred and heated at 47-53° C. for a period of 6 hours, and thereafter at 80° C. for 1½ hours. The reaction mixture was cooled to room temperature and poured into one liter of water. The precipitated product was filtered off and dried. 45.2 g. of the compound were obtained.

In addition to being an outstanding insecticide, the phosphate ester of the present invention is adapted for various other uses, more particularly as a fungicide, plasticizer, corrosion inhibitor, petroleum additive, and flotation agent.

While the invention has been described with particular reference to specific embodiments, it is to be understood that it is not to be limited thereto but is to be construed broadly and restricted solely by the scope of the appended claim.

I claim:

O-(2 - chloro-4-nitrophenyl) O,O - dimethyl thiophosphate.

JOHN H. FLETCHER.

References Cited in the file of this patent

Thurston, F. I. A. T. Report, 949, released May 30, 1947, pages 19 and 20.

Fletcher et al., J. Am. Chem. Soc., vol. 70, pages 3943-3944, November 1948.